United States Patent
Nordgren et al.

(10) Patent No.: US 7,093,397 B2
(45) Date of Patent: *Aug. 22, 2006

(54) POLYMERIC FOAM AND SCRIM SHEATHINGS

(75) Inventors: Douglas S. Nordgren, Winchester, VA (US); John W. Lubker, II, Roswell, GA (US); Kenneth Franklin, Fayeteville, GA (US)

(73) Assignee: Pactiv Corporation, Lake Forest, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/782,480

(22) Filed: Feb. 19, 2004

(65) Prior Publication Data

US 2004/0163348 A1    Aug. 26, 2004

Related U.S. Application Data

(63) Continuation of application No. 09/660,649, filed on Sep. 13, 2000, which is a continuation-in-part of application No. 09/421,031, filed on Oct. 20, 1999, now Pat. No. 6,536,176.

(51) Int. Cl.
*E04B 2/02* (2006.01)

(52) U.S. Cl. .................................. 52/506.01

(58) Field of Classification Search ............ 52/506.01, 52/309.4, 309.8, 543, 404.1, 745.06, 748.11, 52/DIG. 7; 428/304.4, 102, 317.7, 319.7; 442/223, 224, 225, 247

See application file for complete search history.

(56) References Cited

U.S. PATENT DOCUMENTS

| | | | |
|---|---|---|---|
| 1,346,780 A | 7/1920 | Beidler | |
| 1,348,271 A | 8/1920 | Dietze | |
| 3,677,874 A | 7/1972 | Sterrett et al. | 161/116 |
| 4,073,998 A | 2/1978 | O'Connor | 428/310 |
| 4,082,882 A | 4/1978 | Weinstein et al. | 428/246 |
| 4,088,805 A | 5/1978 | Wiegand | 428/310 |
| 4,186,536 A | 2/1980 | Piazza | |
| 4,252,154 A | 2/1981 | Alexander, III | 139/304 |
| 4,418,108 A | 11/1983 | Lin | 428/139 |
| 4,425,396 A | 1/1984 | Hartman | 428/220 |

(Continued)

FOREIGN PATENT DOCUMENTS

CA    741725    8/1966

(Continued)

OTHER PUBLICATIONS

Product Literature, "*Residential Insulation*", TENNECO Building Products, 8 pages, (Nov. 1996).

(Continued)

*Primary Examiner*—James O. Hansen
(74) *Attorney, Agent, or Firm*—Jenkens & Gilchrist (57) ABSTRACT

A sheathing adapted to be fastened to at least one wall supporting structure comprises at least two layers. The first layer comprises a polymeric foam layer. The second layer comprises a polymeric scrim and is located adjacent to the first layer. The second layer has a first portion and a second portion. The second portion is located near the periphery of the polymeric scrim layer. The first portion has a first machine direction (MD) scrim count number and a first transverse direction (TD) scrim count number, and the second portion has a second MD scrim count number and a second TD scrim count number. At least one of the second MD scrim count number and the second TD scrim count number is greater than the respective first MD scrim count number or the first TD scrim count number so as to inhibit failure of the scrim.

15 Claims, 4 Drawing Sheets

U.S. PATENT DOCUMENTS

| | | | |
|---|---|---|---|
| 4,557,092 A | 12/1985 | Brueske | 52/404.1 |
| 4,608,298 A * | 8/1986 | Klaff | 428/102 |
| 4,621,013 A | 11/1986 | Holtrop et al. | 428/245 |
| 4,764,420 A | 8/1988 | Gluck et al. | 428/317.7 |
| 4,810,569 A | 3/1989 | Lehnert et al. | 442/386 |
| 5,049,439 A * | 9/1991 | Robinson | 442/225 |
| 5,053,265 A | 10/1991 | Alexander | 428/182 |
| 5,098,778 A | 3/1992 | Minnick | |
| 5,251,415 A | 10/1993 | Van Auken et al. | 52/407.4 |
| 5,393,598 A * | 2/1995 | Schlecker | 442/186 |
| 5,451,451 A | 9/1995 | Minnick | |
| 5,552,207 A | 9/1996 | Porter et al. | 428/109 |
| 5,554,246 A | 9/1996 | Anwyll, Jr. | 156/253 |
| 5,589,243 A | 12/1996 | Day | 428/56 |
| 5,695,870 A | 12/1997 | Kelch et al. | 428/318.4 |
| 5,773,123 A | 6/1998 | Anwyll, Jr. | 428/137 |
| 5,836,135 A | 11/1998 | Hagan et al. | 52/730.1 |
| 5,869,408 A | 2/1999 | Porter et al. | 442/153 |
| 6,093,481 A | 7/2000 | Lynn et al. | 428/217 |
| 6,536,176 B1 | 3/2003 | Nordgren et al. | 52/506.01 |
| 6,656,858 B1 | 12/2003 | Cahill | 442/370 |
| 2003/0033775 A1 | 2/2003 | Nordgren et al. | 52/309.8 |
| 2003/0074854 A1 | 4/2003 | Nordgren et al. | 52/506.01 |
| 2005/0247023 A1 * | 11/2005 | Nordgren et al. | 52/783.1 |

FOREIGN PATENT DOCUMENTS

CA    2260671    2/1999

OTHER PUBLICATIONS

Product Literature, "*Extruded Polystyrene Insulation and Housewrap*", TENNECO Building Products, 8 pages, (Sep. 1998).
Product Literature, "*New Construction Sheathing*", TENNECO Building Products, 2 pages, (Feb. 1998).

\* cited by examiner

POLYMERIC FOAM AND SCRIM SHEATHINGS

CROSS REFERENCE TO RELATED APPLICATIONS

The present application is a continuation of U.S. patent application Ser. No. 09/660,649, filed on Sep. 13, 2000 which is a Continuation-in-Part of U.S. patent application, Ser. No. 09/421,031 filed on Oct. 20, 1999 now U.S. Pat. No. 6,536,176 B1.

FIELD OF THE INVENTION

The present invention relates generally to sheathings that are used in structures and, more particularly, to polymeric foam sheathing materials that are used in prefabricated housing, site built housing, and remodeling.

BACKGROUND OF THE INVENTION

There are different commercial sheathings that are used in the construction of buildings. Sheathings include materials that span the frame supports of buildings. Some of the commercial products that have been used as sheathing include thin composite laminations, fiberboard, orientated strand board (OSB) and plywood. Some of these products provide structural strength, durability and/or rigidity. These products, however, have disadvantages such as being heavy and difficult to install, providing little insulation and/or having poor moisture resistance.

There are other commercial products that are available as sheathing. For example, polyisocyanurate foam, extruded polystyrene foam, and molded expanded polystyrene (EPS) foam. These existing foamed materials generally have advantages such as increased insulation and easier handling. These existing foamed materials, however, have disadvantages such as their lack of strength as measured by wind resistance. This is shown, for example, by their failures to withstand 100 miles per hour winds when installed. Lack of wind resistance may cause problems such as fracturing, cracking and/or edge pull out of the sheathing from the fasteners. During the pulling of the edge of the material, the fastener generally remains, but the sheathing is pulled away.

Existing foam sheathing is still susceptible to damage at the building site prior to installation. This problem is further evident when, for example, delays occur in the installation and/or the installation occurs in extreme weather conditions. One common example of damage that may occur is when a piece breaks off from a remainder of the sheathing during the process of installation or by vandalism after installation at the building site before being covered with an exterior facing such as siding, brick, or stucco.

Accordingly, a need exists for a sheathing material for use in prefabricated housing, site built housing, and remodeling that overcomes the above-noted shortcomings associated with existing sheathing.

SUMMARY OF THE INVENTION

According to one embodiment of the present invention, a sheathing adapted to be fastened to at least one wall supporting structure comprises at least two layers. The first layer comprises a polymeric foam layer. The second layer comprises a polymeric scrim and is located adjacent to the first layer. The second layer has a first scrim portion and a second portion. The second portion is located near the periphery of the polymeric scrim layer. The first portion has a first machine direction (MD) scrim count number and a first transverse direction (TD) scrim count number, and the second portion has a second MD scrim count number and a second TD scrim count number. At least one of the second MD scrim count number and the second TD scrim count number is greater than the respective first MD scrim count number or the first TD scrim count number so as to inhibit failure of the scrim.

According to another embodiment, a sheathing adapted to be fastened to at least one wall supporting structure comprises at least two layers. The first layer comprises a polymeric foam layer and is located adjacent the second layer. The second layer comprises a polymeric scrim having a uniform scrim count number. The polymeric scrim has a machine direction (MD) scrim count number which is least 18 and a transverse direction (TD) scrim count number which is at least 4 so as to inhibit failure of the scrim.

According to another embodiment of the present invention, a sheathing adapted to be fastened to at least one wall supporting structure comprises at least three layers. The first layer comprises a polymeric foam layer. The second layer comprises a polymeric scrim and has a first portion and a second portion. The second portion is located near the periphery of the polymeric scrim layer. The first portion has a first machine direction (MD) scrim count number and a first transverse direction (TD) scrim count number, and the second portion has a second MD scrim count number and a second TD scrim count number. At least one of the second MD scrim count number and the second TD scrim count number is greater than the respective first MD scrim count number or the first TD scrim count number so as to inhibit failure of the scrim. The third layer comprises an impact polystyrene and is located between the first and the second layers.

According to one method of the present invention, a sheathing is provided that comprises at least two layers. The first layer comprises a polymeric foam layer. The second layer comprises a polymeric scrim and is located adjacent to the first layer. The second layer has a first portion and a second portion. The second portion is located near the periphery of the polymeric scrim layer. The first portion has a first machine direction (MD) scrim count number and a first transverse direction (TD) scrim count number, and the second portion has a second MD scrim count number and a second TD scrim count number. At least one of the second MD scrim count number and the second TD scrim count number is greater than the respective first MD scrim count number or the first TD scrim count number so as to inhibit failure of the scrim. The sheathing is installed to a wall supporting structure.

BRIEF DESCRIPTION OF THE DRAWINGS

FIG. 7 shows a cut-away perspective view of a five-layer sheathing fastened to a wall supporting structure according to one embodiment of the present invention using the second layer embodiment depicted in FIG. 2a.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF SPECIFIC EMBODIMENTS

Figure 1:
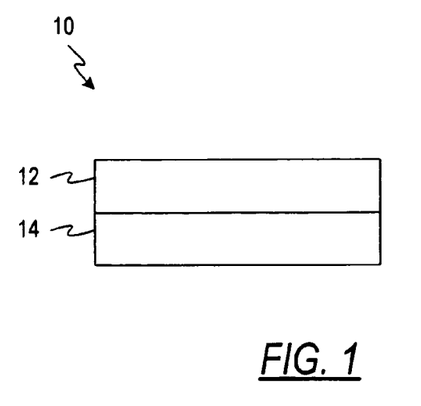
FIG. 1 shows a side view of a two-layer sheathing according to one embodiment of the present invention.

Turning now to the drawings and referring initially to FIG. 1, a two-layer sheathing 10 is shown according to one embodiment of the present invention. The sheathings of the present invention, including sheathing 10, are adapted to be fastened to a wall supporting structure. On a building, sheathings are typically covered by an exterior facing such as siding, brick or stucco. The sheathing 10 of FIG. 1 comprises a polymeric scrim layer 12 and a polymeric foam layer 14. The polymeric scrim layer 12 of the present invention provides additional strength and durability to the polymeric foam layer 14.

Polymeric Scrim Layer

The polymeric scrim layer 12 may be made of woven material or non-woven material. Woven material is generally defined as long fibers that are intertwined to produce a material. Non-woven material is generally defined as randomly joined fibers that are bonded or pressed together by adhesive or other means. The randomly joined fibers that form non-woven material are typically shorter than those used in forming woven material. The woven material is generally preferred because it provides an excellent strength to weight ratio that is desirable in wind-resistant applications.

One type of woven scrim that may be used in polymeric scrim layer 12 is a scrim that runs in the machine direction (MD) and the weft or transverse direction (TD). For example, a scrim having a scrim count of 28×4 indicates that the scrim has 28 cords, filaments, or strands per inch in the machine direction and 4 cords, filaments, or strands per inch in the transverse direction. A scrim having cords that run in the machine direction and the weft or transverse direction is commonly referred to as a cross-woven scrim. This type of woven scrim may be the type that is commonly used in applications such as carpet backing.

Figure 2A:
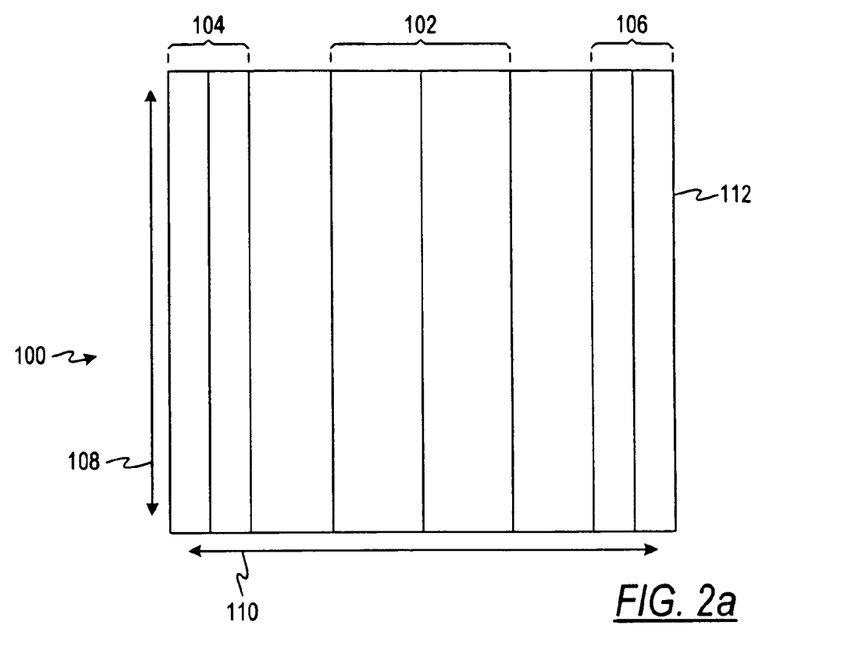
FIGS. 2a and 2b show front views of the second layer of the sheathing according to two embodiments of the present invention.
Figure 2B:
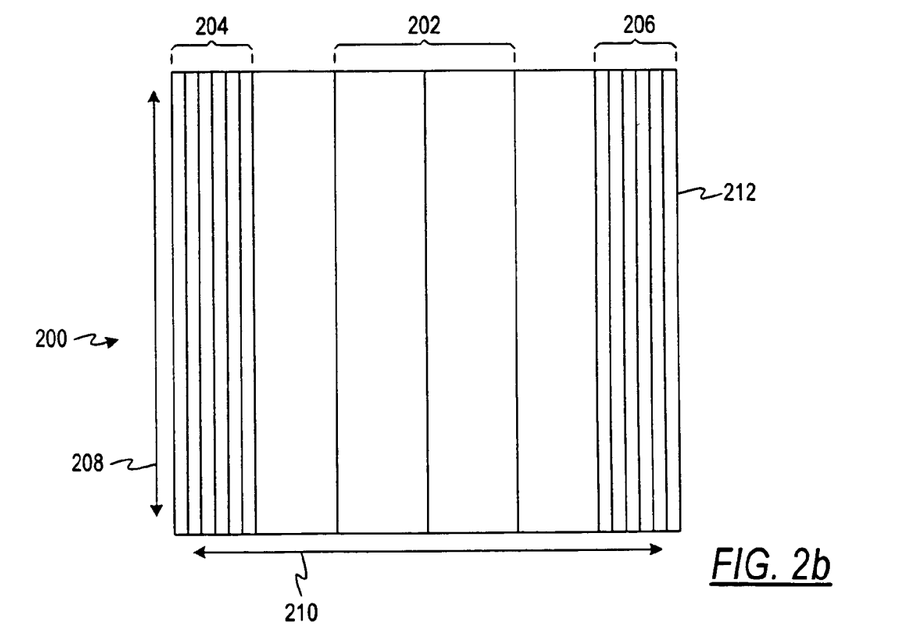

FIGS. 2a and 2b depict embodiments of respective polymeric scrim layers 112, 212 according to the present invention. As depicted in FIG. 2a, the polymeric scrim layer 112 has a first portion 102 and a second portion 104. The first portion 102 is located in the central area of the polymeric scrim layer 112 while the second portion 104 is located near the periphery of the polymeric scrim layer 112. The second portion 104 extends from the periphery of the polymeric scrim layer 112 inwardly toward the central portion of the polymeric scrim layer 112.

The first portion 102 has a first machine direction (MD) scrim count number running in the machine direction 108 and a first transverse direction (TD) scrim count number running in the transverse direction 110. Similarly, the second portion 104 has a second MD scrim count number running in the machine direction 108 and a second TD scrim count number running in the transverse direction 110. At least one of the second MD scrim count number and the second TD scrim count number is greater than the respective first MD scrim count number or the first TD scrim count number. By increasing the scrim count at the periphery of the polymeric scrim layer 112, the periphery of the polymeric scrim layer 112 is reinforced and inhibits the scrim from unraveling.

As depicted in FIG. 2a, the polymeric scrim layer 112 may also include a third portion 106. The third portion 106 is located near the periphery of the polymeric scrim layer 112 opposite the second portion 104. The third portion 106 extends from the periphery of the polymeric scrim layer 112 inwardly toward the central portion of the polymeric scrim layer 112. The third portion 106 has a third MD scrim count number running in the machine direction 108 and a third TD scrim count number running in the transverse direction 110. At least one of the third MD scrim count number and the third TD scrim count number is greater than the respective first MD scrim count number or the first TD scrim count number. Optionally, the second and third MD scrim count numbers are the same, and the second and third TD scrim count numbers are the same.

As depicted in FIGS. 2a and 2b, the second and third MD scrim count numbers vary. The MD scrim count number, however, can be varied based upon the desired use of the sheathing and the cost. FIG. 2a depicts an embodiment where the second MD scrim count number is the same at the third MD scrim count number and the second and third MD scrim count numbers are at least two times the first MD scrim count number. The second and third MD scrim count numbers can range from at least two times, at least four times, and to at least six times the first MD scrim count number.

FIG. 2b depicts another embodiment of the polymeric scrim layer 212 according to the present invention. Polymeric scrim layer 212 has a first portion 202, a second portion 204 and a third portion 206. The first portion 202 is located in the central area of the polymeric scrim layer 212. The second and third portions 204, 206 are located near the periphery of the polymeric scrim layer 212 on opposing sides. The first portion 202 has a first MD scrim count number in the machine direction 208 and a first TD scrim count number in the transverse direction 210. The second portion 204 has a second MD scrim count number in the machine direction 208 and a second TD scrim count number in the transverse direction 210. The third portion 206 has a third MD scrim count number in the machine direction 208 and a third TD scrim count number in the transverse direction 210. FIG. 2b depicts an embodiment where the second and third MD scrim count numbers are the same and the second and third MD scrim count numbers are at least six times the first MD scrim count number.

The distance that the second and third portions extend from the periphery of the polymeric scrim layer 112, 212 varies. The second and third portions generally extend from the periphery of the polymeric scrim layer 112, 212 about ½ of an inch to about 3 inches. The second and third portions preferably extend from the periphery of the polymeric scrim layer 112, 212 about ½ of an inch to about 1 inch.

The second portion 104, 204 is preferably located on at least two opposing portions of the periphery of the polymeric scrim layer 112, 212. It is preferred that the second portion extends along two entire sides of the polymeric scrim layer 112, 212. It is also contemplated that the third portion 106, 206 may be located on one or more of the sides of the polymeric scrim layer 112, 212 rather than the second portion 104, 204. The second and third portions are located generally parallel to the wall supporting structure.

It is contemplated that various scrim counts may be used in forming the polymeric scrim layer having an increased scrim count at the periphery. Examples of suitable scrim counts that may be used in the central portion of the polymeric scrim layer having an increased scrim count at the periphery include 7×4, 8×6, 9×4, 21×4, 24×4, 28×4, 18×6, and 21×6. It is contemplated that the scrim count number at the periphery of the polymeric layer will be greater than the scrim count number in the central portion and that the selection of the scrim count number at the periphery will vary based on the desired use of the sheathing and the cost.

According to another embodiment, the polymeric scrim layer has a uniform scrim count number so as to inhibit failure of the scrim. According to this embodiment, the polymeric scrim layer has an MD scrim count number which is least 18 and a TD scrim count number which is at least 4. Examples of suitable scrim counts that may be used where the polymeric scrim layer has a uniform scrim count number include 21×4, 24×4, 28×4, 18×6, and 21×6.

The polymeric scrim layer 12 may be made of materials such as polyolefins, polyesters and nylons. Polyolefins that may be used in the polymeric scrim layer 12 include polypropylenes or polyethylenes. The term "polypropylene" as used herein includes polymers of propylene or polymerizing propylene with other aliphatic polyolefins, such as ethylene, 1-butene, 1-pentene, 3-methyl-1-butene, 4-methyl-1-pentene, 4-methyl-1-hexene, 5-methyl-1-hexene and mixtures thereof. Polypropylene not only includes homopolymers of propylene, but also propylene copolymers comprised of at least 50 mole percent (preferably at least 70 mole percent) of a propylene unit and a minor proportion of a monomer copolymerizable with propylene and blends of at least 50 percent by weight of the propylene homopolymer with another polymer.

The term "polyethylene" as used herein includes low density polyethylene (LDPE), medium density polyethylene (MDPE), high density polyethylene (HDPE), very low density polyethylene (VLDPE), linear low density polyethylene (LLDPE), metallocene-catalyzed linear low density polyethylene (mLLDPE) and combinations thereof.

LDPE is generally defined as an ethylenic polymer having a specific gravity of from about 910 to about 925 kg/m$^3$. MDPE is generally defined as an ethylenic polymer having a specific gravity between the LDPEs and the HDPEs (i.e., from about 925 to about 940 kg/m$^3$). The high density polyethylene (HDPE) of the present invention has a specific gravity of from about 940 to about 970 kg/m$^3$. The term polyethylene as used herein includes homopolymers of ethylene and copolymers comprised of at least 50 mole percent of a ethylene unit (preferably at least 70 mole percent) and a minor (i.e., less than 50%) proportion of a monomer copolymerizable with the ethylene unit. The term LDPE as used herein also includes physical blends of two or more different homopolymers that are classified as LDPEs. Similarly, the term MDPE and HDPE may also include blends of two or more different homopolymers classified as MDPEs and HDPEs, respectively.

The VLDPE resins have densities ranging from about 880 to about 912 kg/m$^3$, more commonly from about 890 to about 910 kg/m$^3$, and melt indices of from about 0.5 to about 5 g/10 min., and from about 1 to about 3 g/10 min.

The LLDPE of the present invention generally has from about 1 to about 20, preferably from about 1 to about 10 weight percent of said higher alpha olefin monomer copolymerized therein. In addition, the alpha olefin monomer employed in the ethylenic copolymer may be selected from the group consisting of 1-butene, 3-methyl-1-butene, 3 methyl-1-pentene, 1-hexene, 4-methyl-1-pentene, 3-methyl-1-hexene, 1-octene and 1-decene. The LLDPE resins that may be used in the present invention have densities ranging from about 890 to about 940 kg/m$^3$, more commonly from about 900 to about 930 kg/m$^3$, and a melt index ($I_2$) of from about 1 to about 10 g/10 min. as determined by ASTM D1238.

The metallocene-catalyzed polyethylene (mLLDPE) is a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene.

The low polydispersity polymer has a density of from about 880 to about 940 kg/m$^3$. The polydispersity polymer generally have a molecular weight distribution, or polydispersity, ($M_w/M_n$, "MWD") within the range of from about 1 to about 4, and more typically from about 2 to about 3. The melt flow ratio (MFR) of these polymers, defined as $I_{20}/I_2$ and as determined in accordance to ASTM D1238, is generally from about 12 to about 22 and typically from about 14 to about 20. The melt index (MI), defined as the $I_2$ value, should be in the range of from about 0.5 to about 10 g/10 min. and typically from about 1 to about 5 g/10 min. as determined by ASTM D1238.

An example of a "polyester" includes a polyester resin which is a polycondensation product of a dicarboxylic acid with a dihydroxy alcohol. An example of a "polyethylene terephthalate" includes a polyester resin made from ethylene glycol and terephthalic acid. An example of a "nylon" is a polyamide polymer that is characterized by the presence of the amide group (—CONH).

It is contemplated that additional polymeric scrim layer(s) can be added to the sheathing. For example, the sheathing may include polymeric scrim layers on opposing sides of the polymeric foam layer.

Polymeric Foam Layer

The polymeric foam layer 14 is located adjacent to the scrim layer 12 in FIG. 1. The polymeric foam layer 14 may be made from alkenyl aromatic resins, such as polystyrenic resin(s), and polyesters such as polyethylene terephthalates. The term "alkenyl aromatic polymer" as used herein includes polymers of aromatic hydrocarbon molecules that contain an aryl group joined to an olefinic group with only double bonds in the linear structure. The polymeric foam layer 14 may also be made from polyolefinic resins such as LDPEs, HDPEs, LLDPEs, and the like. The polymeric foam layer 14 is preferably made from a polystyrenic resin(s), such as a general purpose polystyrene, because of economical considerations at the present time. The polymeric foam layer 14, however, may be made from other polystyrenic resins such as impact polystyrenes. The impact polystyrenes that are generally used include medium impact polystyrenes and high impact polystyrenes. The polymeric foam layer 14 may also be made from a combination of virgin and/or reprocessed material. The polymeric foam layer 14, however, may also be made from polyisocyanurate foam.

The polymeric foam layer 14 and the polymeric scrim layer 12 may be bonded by attaching, adhering, fusing or the like. For example, the polymeric foam layer 14 and the polymeric scrim layer 12 may be thermally bonded to each another depending on the selected materials for forming the layers 12 and 14. Thermal bonding may be accomplished by conventional methods, such as a flameless air torches, heated rolls, radiant heaters and infrared heating.

Adhesive and Other Layers

Figure 3:
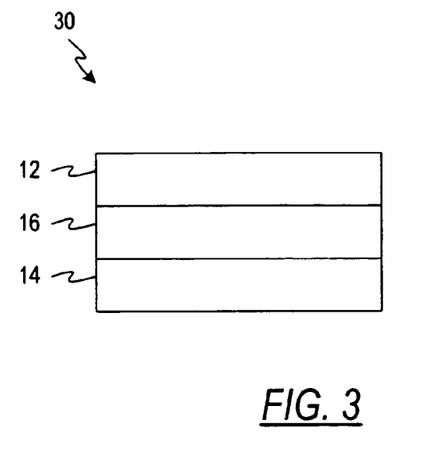
FIG. 3 shows a side view of a three-layer sheathing according to another embodiment of the present invention.

Alternatively, the polymeric foam layer 14 and the polymeric scrim layer 12 may be attached with an adhesive layer. This is shown in FIG. 3 where sheathing 30 includes a polymeric scrim layer 12, a polymeric foam layer 14 and an adhesive layer 16. The optional adhesive layer 16 is located between the polymeric scrim layer 12 and the polymeric foam layer 14. One type of adhesive that may be used is ethylene vinyl acetate (EVA). For example, modified EVAs such as BYNEL® made by DuPONT® or Plexar® made by Equistar Chemicals may be used. These modified EVAs have melt indices generally from about 6.4 to about 25 g/10 min. as measured by ASTM D1238 and densities generally from about 923 to about 947 kg/m$^3$ as measured by ASTM D11505. BYNEL® is an adhesive that is designed to bond materials that would not ordinarily adhere to each other.

Other adhesives that may be used include block copolymers that comprise polymeric regions of styrene-rubber-styrene. For example, KRATON® made by Shell® Chemical Company may be used. Other adhesives are contemplated in the present invention to bond the polymeric scrim layer 12 to the polymeric foam layer 14.

Figure 4:
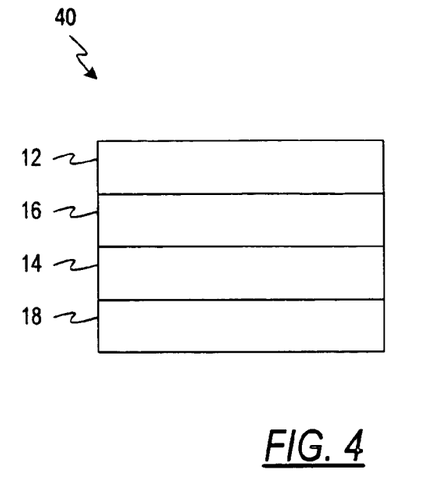
FIG. 4 shows a side view of a four-layer sheathing according to another embodiment of the present invention.
Figure 5:
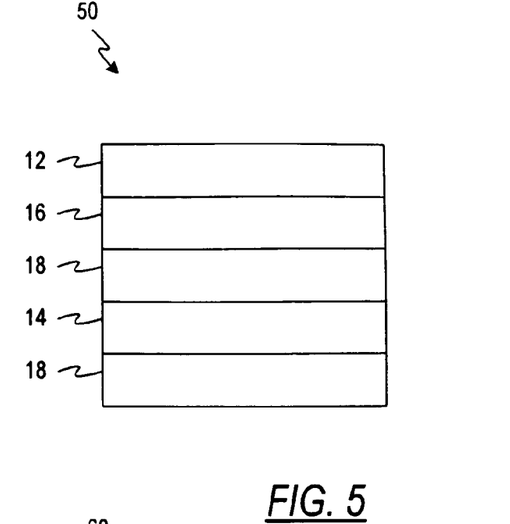
FIG. 5 shows a side view of a five-layer sheathing according to yet another embodiment of the present invention.
Figure 6:
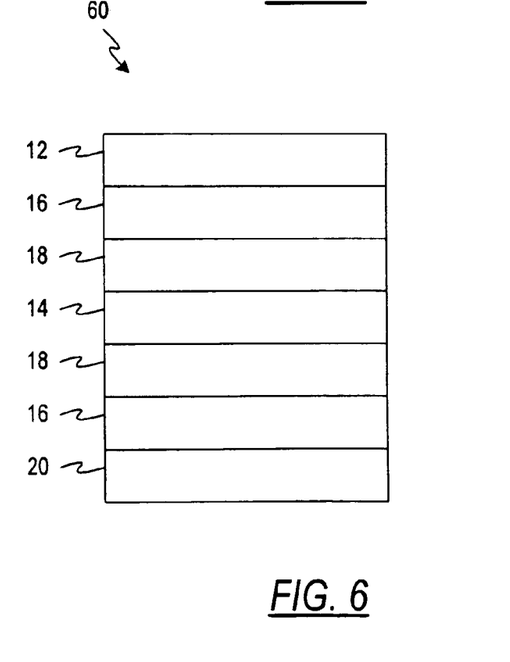
FIG. 6 shows a side view of a seven-layer sheathing according to a further embodiment of the present invention.

Additional layers are contemplated in the sheathings of the present invention. For example, FIGS. 4, 5 and 6 depict a four-layer sheathing, a five-layer sheathing and a seven-layer sheathing, respectively. Referring specifically to FIG. 4, sheathing 40 includes a polymeric scrim layer 12, a polymeric foam layer 14, an adhesive layer 16 and an impact polystyrenic layer 18. The polystyrenic layer 18 is preferably made from a high impact polystyrene because of its desired stiffness. The polystyrenic layer 18 may be biaxially orientated so as to provide additional durability and flexibility.

FIG. 5 depicts a sheathing 50 that is similar to the sheathing 40 of FIG. 4 except that the sheathing 50 includes an additional impact polystyrenic layer 18. Sheathing 60 of FIG. 6 comprises the same five layers of the sheathing 50 of FIG. 5. The sheathing 60 of FIG. 6, however, also comprises two additional layers. Specifically, the sheathing 60 includes an additional adhesive layer 16 and a polymeric film layer 20. To provide additional strength and durability, the polymeric film layer 20 may be made from a polyolefin(s) such as polypropylene.

Other layers are contemplated for the sheathings of the present invention. For example, the sheathings of the present invention may include radiant barrier layers or flame retardant layers.

Properties of the Sheathing

The sheathings of the present invention generally have a flexural strength of at least 100 lbs./in.$^2$, preferably at least 150 lbs./in.$^2$ and most preferably at least 200 lbs./in.$^2$ as measured by ASTM D1307. The sheathings of the present invention have excellent strength so as to provide resistance to high winds. The sheathings of the present invention preferably satisfy the structural design requirements as set forth in the H.U.D. Guide for Manufactured Home Standards Programs (9th edition, December 1994) for Wind Zone II conditions (a design wind speed of 100 miles per hour) taken from §3280.305(c) of the Federal Register. The sheathings also preferably satisfy the structural design requirements as set forth in H.U.D. Guide for Manufactured Home Standards Programs (9th edition, December 1994) for Wind Zone III conditions (a design wind speed of 110 mph) taken from §3280.305(c) of the Federal Register.

The sheathings of the present invention may be formed into a number of shapes. For example, the sheathing may be a flat sheet or a folded or hinged board (typically referred to as a fanfolded sheathing). The fanfold sheathing is designed to unfold at its hinges and includes a number of individual panels.

The sheathings of the present invention may be manufactured in a variety of sizes. Popular sizes used in the housing market include a 4 foot by 7 foot (4'×7'), 4'×7½', 4'×8' and 4'×9' flat sheets. Other popular sizes in the housing market include a 4'×50' fanfolded sheathing which includes a number of individual panels. If a fanfolded sheathing is used, it is preferred to have cross-members in the wall supporting structure for which the fanfolded sheathing may be attached.

The thickness of the sheathings may also vary. The thickness of the sheathing is generally from about ¼ of an inch to about 3 inches as measured by ASTM C303. The thickness of the sheathing is preferably from about ¼ of an inch to about ¾ of an inch as measured by ASTM C303.

The layers of the sheathings typically vary in their respective weight percent relative to each other. The sheathings generally comprise from about 2 wt. % to about 30 wt. % of the polymeric scrim layer(s) 12. The sheathings generally comprise from about 25 wt. % to about 99 wt. % of the polymeric foam layer(s) 14. The sheathings generally comprise from 0 wt. % to about 15 wt. % of the adhesive layer(s) 16. It is contemplated that the remainder of the sheathings may include other optional layers. The sheathings generally comprise from 0 wt. % to about 50 wt. % of the impact polystyrenic layer(s) 18 and from 0 wt. % to about 50 wt. % of the polymeric film layer(s) 20. The sheathings preferably comprise from about 2 to about 25 wt. %, and most preferably from about 4 wt. % to about 20 wt. % of the polymeric scrim layer(s) 12. The sheathings preferably comprise from about 30 to about 95 wt. %, and most preferably from about 40 wt. % to about 90 wt. % of the polymeric foam layer(s) 14. Preferably, the sheathings comprise from about 1 to about 10 wt. %, and most preferably from about 1 wt. % to about 7 wt. % of the adhesive layer(s) 16. The sheathings preferably comprise from about 5 to about 35 wt. %, and most preferably from about 5 wt. % to about 30 wt. % of the impact polystyrenic layer(s) 18. The sheathings preferably comprise from 0 to about 25 wt. %; and most preferably from 0 wt. % to about 20 wt. % of the polymeric film layer(s) 20.

Figure 7:
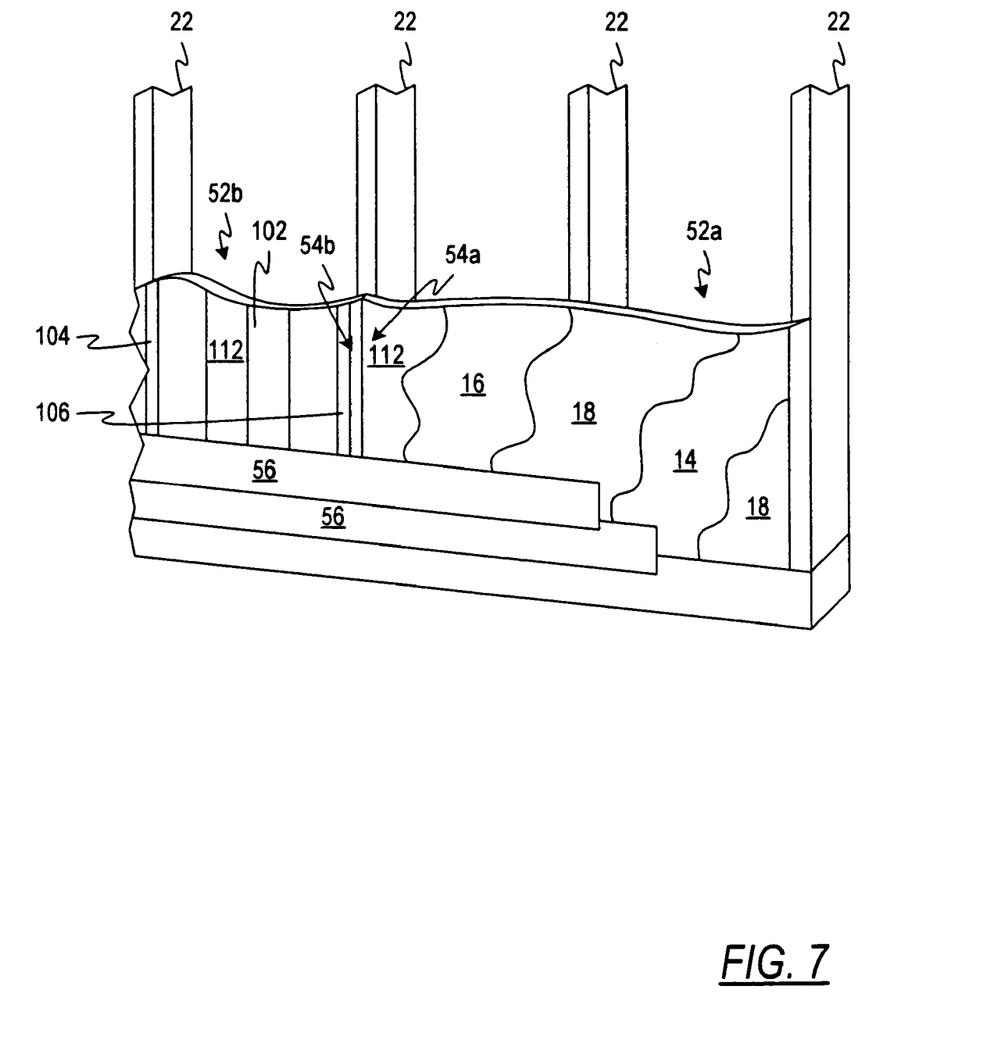

The sheathings of the present invention may be used in various buildings such as prefabricated housing (also referred to as manufactured housing), site built housing, and remodeling. The sheathing may be installed to a wall supporting structure. An example is shown in FIG. 7 where a sheathing 52 is installed to a plurality of wall supporting structures 22 using the polymeric scrim layer 112 of FIG. 2a. The sheathing 52a has been cut-away to depict the various layers 112, 14, 16 and 18, while sheathing 52b has not been cut-away in FIG. 7. FIG. 7 also shows siding 56 being located on an exterior surface of the sheathing 52.

The sheathing 52 of FIG. 7 may be installed to the plurality of wall supporting structure 22 by the use of fasteners (not shown). The fastener may be a mechanical fastener such as a staple or nail. According to the embodiment depicted in FIG. 7, the polymeric scrim layer 112 of the sheathing 52 includes a first portion 102, a second portion 104, and a third portion 106 opposite the second portion 104. The second and third portions 104, 106 are located generally parallel to the wall supporting structure 22.

It is contemplated that the sheathing of the present invention may be used in a roofing application to provide additional strength, to resist wind uplift and to provide durability that minimizes breakage during handling and installation. The sheathing may be used as an underlayment for low slope roofs.

PROCESS OF THE PRESENT INVENTION

According to one process of the present invention, a polymeric web of foam is provided to form the polymeric foam layer. The process may use a single twin screw extruder or a tandem foam extrusion line. For example, the process begins by loading pellets of a polymeric resin(s) such as polystyrenic foam resin. The polymeric resins in their solid form are added into an extrusion hopper.

A nucleating agent (also referred to as cell size control agent) or combination of such nucleating agents may be employed in the process of the present invention for advantages such as their capability for regulating cell formation and morphology. The amount of nucleating agent to be added depends upon the desired cell size, the selected blowing agent and the density of the polymeric composition. Known nucleating agents such as talc, mixtures of sodium bicarbonate and citric acid, and the like may be employed in the present invention.

It is contemplated that stability control agent(s) may also be added to the polymeric resin(s), including conventional stability control agents. Some examples of stability control agents that may be used include, but are not limited to, glycerol monostearate, saturated higher fatty acid amides and glycerol monoester of a $C_{20}$–$C_{24}$ fatty acid.

If desired, fillers, colorants, light and heat stabilizers, plasticizers, chemical blowing agents, flame retardants, foaming additives and plastic compounding agents may be added to the polymeric composition. The polymeric composition comprises the polymeric resin and, if added, the nucleating agent, the stability control agent and additives. The polymeric composition is conveyed through a feed zone of the extruder and heated at a temperature sufficient to form a polymeric melt.

A physical blowing agent may be added at the injection port area of the extruder in an appropriate ratio to the target density. The selected blowing agent may be any type that is capable of producing foam with the selected resin. Some examples of blowing agents include physical blowing agents such as halocarbons, hydrocarbons or combinations thereof. Examples of these include commercially available hydrofluorocarbons, such as HFC-152a and HFC-134a, hydrochlorofluorocarbons, such as HCFC-22 or HCFC-142b, and the $C_3$–$C_6$ hydrocarbons. Other types of blowing agents include carbon dioxide. The polymeric composition and the selected blowing agent are thoroughly mixed within the extruder in a mixing zone and subsequently cooled in a cooling zone. The cooled polymeric-blowing agent melt is extruded thorough a die.

Figure 8:
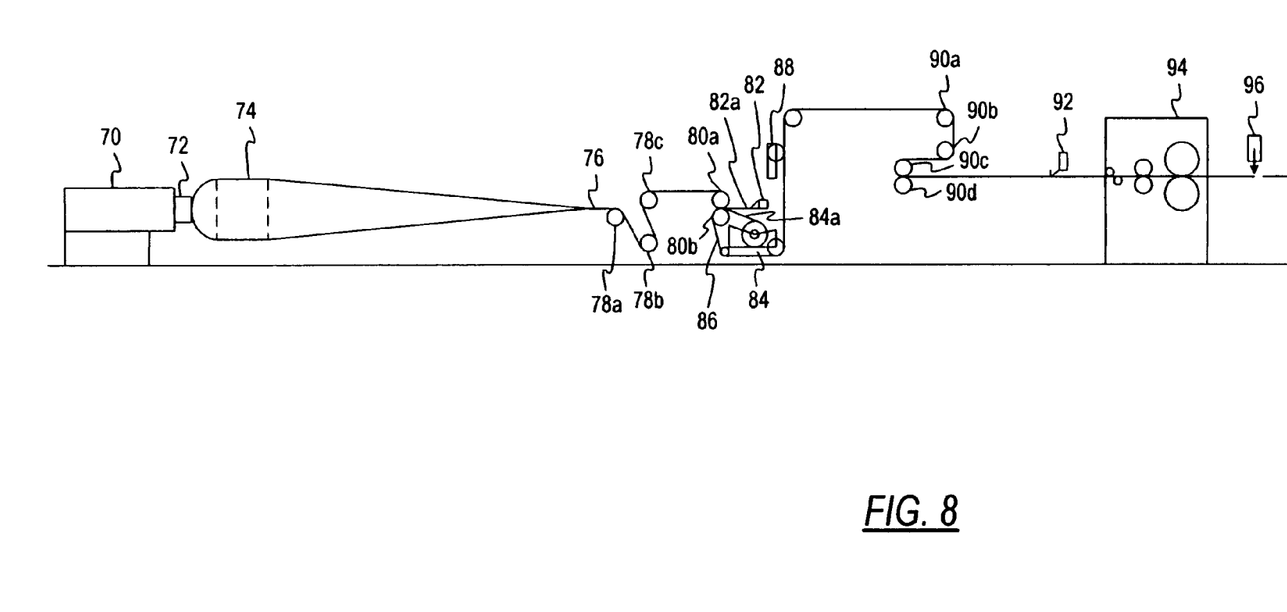
FIG. 8 shows a schematic flow diagram of an overall sequence of operations according to one process involved in the manufacture of a three-layer sheathing such as that shown in FIG. 3.

One method of the present invention for making a three-layer sheathing is shown in a schematic flow diagram in FIG. 8. In the process of FIG. 8, the polymeric foam is extruded from an extruder 70 through a round die 72. After exiting the round die 72, the extrudate expands when entering a lower pressure region (e.g., the atmosphere) and forms a polymeric web of foam. The polymeric web of foam is stretched over a sizing mandrel 74 to size and then is slit to form the web of foam. The polymeric web of foam will eventually be used in forming the polymeric foam layer 14.

At least one of the outer surfaces of the polymeric web of foam is typically cooled so as to form a "skin." The skin is typically about a few thousands (or a few mils) thick, but may vary depending on the cooling employed. The skin provides additional strength and also provides a smoother surface that is more aesthetically pleasing to a consumer if the polymeric layer is visible to the customer. It is contemplated that cooling methods may be accomplished by using air and water. The skinning may be performed, for example, by stretching the polymeric foam of web 76 over the sizing mandrel 74 with optional cooling wherein either surface of the polymeric foam of web 76 is cooled. It is contemplated that one or more of the surfaces of the polymeric web of foam may be cooled.

The polymeric foam web 76 proceeds to travel around a S-wrap of rollers 78a–c in which roller 78a is an idler roller and rollers 78b and 78c are driven or pull rollers. The driven rollers 78b, 78c assist in moving the polymeric foam web 76 through the process of the present invention. The polymeric foam web 76 proceeds between two driven rollers 80a,b. Driven rollers 80a,b assist in maintaining a consistent surface on which a web of adhesive 82a is added via an adhesive coating or a laminating machine 82. The adhesive machine 82 may be any conventional machine that is capable of applying the adhesive web 82a to the polymeric foam web 76. The adhesive machine 82 may coextrude the web of adhesive 82a with a second web, such as a web of impact polystyrene (not shown).

At the about the same time, a web of scrim 84a is added via a roll unwind cart system 84. The cart system 84 may include an edge alignment system to properly align the web of scrim 84a to the polymeric foam web 76. After exiting the driven rollers 80a,b, the polymeric foam web 76, the web of adhesive 82a, and the web of scrim 84a form a sheathing web 86.

It is contemplated that the sheathing web 86 may be processed to include printing on one or more surfaces or other treatments. The process of FIG. 8 includes an optional printer 88 that prints on one surface of the sheathing web 86. It is contemplated that the printing may occur on the polymeric foam web 76 before the webs of adhesive and scrim are added to the polymeric foam web 76. The sheathing web 86 proceeds around a series of rollers 90a–90d and then to an optional edge trim system 92. The edge trim system assists in sizing the sheathing web 86 to be used in forming the sheathing of the present invention.

As shown in FIG. 8, the sheathing web 86 proceeds through an optional perforating creasing machine 94. The perforating creasing equipment 94 may include any conventional equipment that is capable of folding the sheathing web 86 of the present invention into a fanfold sheathing web. Of course, if flat sheathing is desired, the creasing equipment 94 should not be included in the process. A perforating machine, however, may be used in producing a flat sheathing. The sheathing web is then cut to a desired dimension by shearing equipment 96. The shearing equipment 96 may be any equipment capable of cutting the sheathing web 86 into desired dimensions. It is also contemplated that other finishing operations may occur such as stacking, counting, packaging and trimming. It is also contemplated that various measurements may be taken throughout the process to ensure consistent measurements.

According to a second process of the present invention (not shown), additional layers may be added in forming other sheathings, such as those described above. For example, a machine (not shown) may be added to the process of FIG. 8 that is adapted to add an additional impact polystyrenic web to the polymeric web of foam.

EXAMPLES

Example 1

Negative wind pressure load tests were conducted on samples of sheathing ("Sheathing 1") using a 2×4 (1½ inches×3½ inches) stud wall supporting *structure*. S*heathing* 1 had dimensions of 48 inches by 90 inches (48"×90"). Sheathing 1 consisted of five layers with the first layer being a woven polypropylene scrim having a scrim count of 28×4. The second layer was made of a BYNEL® adhesive. The third and fifth layers were made of high impact polystyrene. The second layer was located between the first and third layers. The fourth layer was a polystyrene foam and was located between the third and fifth layers. This is a similar structure as shown above in FIG. 7. The following describes the test specimens that were used in Example 1.

Example 1

Specimen Description

A. Materials
1. Stud: Double 2×4, Stud Grade spruce pine fur (SPF) spaced at 16" on center (o.c.)
2. Top Plate: Single 1×4, Ungraded SPF
3. Bottom Plate: Single 1×4, Ungraded SPF
4. Gypsum: 5/16"×48"×90" Georgia Pacific
5. Siding: Georgia Pacific 4.5 Lap Vinyl Siding with a nailing flange thickness of 0.036 inch
6. Adhesive: PVA B. Fastening Top plate attached to studs with three (3)—7/16"×1¾"×15 gauge (Ga.) Staples.

Bottom plate attached to studs with three (3)—7/16"×1¾"×15 Ga. Staples.

Sheathing 1 fastened with 1"×1½"×16 Ga. staples at 3" o.c. on single framing members.

Gypsum fastened to studs with 3/16"×1"×19 Ga. staples at 16" o.c. per strip of siding.

Gypsum glued to frame with a 3/8" bead of PVA glue on all framing *members*.

Siding fastened to Sheathing 1 into the studs with 7/16"× 1½"×16 Ga. staples at 16" o.c. per strip of siding.

C. Construction

The 48"×90" test sample was first assembled with 2×4 studs that were 87.75 inches long. The top and bottom plates were 49.5 inches long. Polyethylene sheeting (6 mil) was placed between the 2×4 framing and Sheathing 1. The framing was then squared with Sheathing 1 and fastened as described above. The horizontal vinyl siding was fastened through Sheathing 1 and into the studs. The 5/16" gypsum was then fastened to the opposite side of the frame as described above. Glue was allowed to cure for 7 days before the testing began. Materials for the assemblies tested were commercially purchased products.

Example 1

Test Setup and Procedure

The testing was conducted in accordance with the ultimate load test procedures in H.U.D. Guide for Manufactured Home Standards Programs (9th edition, December 1994) taken from §3280.401(b) of the Federal Register. An 11¼" deep wood box was built 1" wider and 1" longer than the test sample. The top and bottom plates of the test samples were secured to 2×4 ledgers. The test samples were placed vertically on the test fixture with the vinyl siding facing down and the ledgers bearing on top of the wood box. The polyethylene sheeting (6 mil) that was placed between the wall framing and Sheathing 1 was sealed to the table. This allowed the entire surface of Sheathing 1 to be exposed to the full negative loads.

The uniform load was applied by evacuating the air below the test specimen using a vacuum pump. The applied load was measured with a water manometer capable of reading in 0.1 inch increments. The load was applied in approximate ¼ design live load increments at 10 minute intervals until 1.25 times design load was reached. The load was then increased to 2.5 times design load or until failure occurred. The load in inches of water column was converted to pounds per square foot (psf) by using the conversion of 1 inch (of water column) to 5.2 psf.

Deflection readings were taken using dial indicators capable of reading in 0.001" increments. The deflections were taken at the quarter-points of the center stud.

Example 1

Results

Three specimens (S1, S2, and S3) using 5/16" Georgia Pacific Gypsum were tested for corner Wind Zone III requirements. The product sold by Georgia Pacific Corporation that was used was 5/16" PreDeck® Gypsum Board. The ultimate load in pounds per square foot (psf) was determined in accordance with H.U.D. Guide for Manufactured Home Standards Programs (9th edition, December 1994) taken from §3280.401(b) of the Federal Register. The average of these three specimens is shown under the "AVG." column. The results are as follows in Table 1.

TABLE 1

| EXPER. NO. | ULTIMATE LOAD (PSF) | | | AVG. (PSF) | DEFLECTION (PASS/FAIL) | WINDZONE |
|---|---|---|---|---|---|---|
| | S1 | S2 | S3 | | | |
| 1 | 156 | 150.8 | 161.2 | 156 | PASSED | III Corner |

The samples in Experiment 1 satisfied the ultimate load under a corner condition for Wind Zone III. In addition, the samples in Experiment 1 also passed the deflection test under a corner condition for Wind Zone III. The ultimate load requirement for Wind Zone III for a non-corner condition is 115 psf, while the ultimate load requirement for Wind Zone III for a corner condition is 145 psf.

Example 2

Negative wind pressure load tests were conducted on samples of 48"×90" Sheathing 1 (described above in Example 1). The following describes the test specimens that were used in Example 2.

Example 2

Specimen Description

A. Materials
1. Stud: 2×4, Stud Grade SPF spaced at 16" o.c.
2. Top Plate: Single 1×4, Ungraded SPF
3. Bottom Plate: Single 1×4, Ungraded SPF
4. Gypsum: 5/16"×48"×90" Gypsum, Georgia-Pacific
5. Siding: Georgia Pacific 4.5 Lap Vinyl Siding with a nailing flange thickness of 0.036 inch
6. Adhesive: PVA B. Fastening
Top plate attached to studs with three (3)—7/16"×1¾"×15 Ga. Staples.
Bottom plate attached to studs with three (3)—7/16"×1¾"×15 Ga. Staples.
Sheathing 1 fastened with 1"×1½"×16 Ga. staples at 3" o.c. on framing members.
Gypsum fastened to studs with 3/16"×1"×19 Ga. Staples at 16" o.c. per strip of siding.
Gypsum glued to frame with a 3/8" bead of PVA glue on all framing members.
Siding fastened to sheathing into the studs with 7/16"×1½"×16 Ga. staples at 16" o.c. per strip of siding.

C. Construction
The construction was similar to that described above in Example 1.

Example 2

Test Setup and Procedure

The test setup and procedure were similar to that described above in Example 1.

Example 2

Results

Three specimens (S1, S2, S3) using 5/16" Georgia-Pacific Gypsum were tested for non-corner Wind Zone III requirements. The results are as follows in Table 2.

TABLE 2

| EXPER. NO. | ULTIMATE LOAD (PSF) | | | AVG. (PSF) | DEFLECTION (PASS/FAIL) | WINDZONE |
|---|---|---|---|---|---|---|
| | S1 | S2 | S3 | | | |
| 2 | 135.2 | 140.4 | 135.2 | 136.9 | PASSED | III Non-Corner |

The samples in Experiment 2 passed the requirement for ultimate load under a non-corner condition for Wind Zone III. In addition, the samples in Experiment 2 also passed the deflection test under a non-corner condition for Wind Zone III.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A sheathing adapted to be fastened to at least one wall supporting structure, the sheathing comprising at least three layers:
    (a) a first layer comprising a polystyrenic foam layer;
    (b) a second layer comprising a polymeric cross-woven scrim, the polymeric cross-woven scrim including a first portion and a second portion, the second portion being located near the periphery of the polymeric scrim layer, the first portion having a first machine direction scrim count number and a first transverse direction scrim count number, the second portion having a second machine direction scrim count number and a second transverse direction scrim count number, at least one of the second machine direction scrim count number and the second transverse direction scrim count number being greater than the respective first machine direction scrim count number or the first transverse direction scrim count number;
    (c) a third layer comprising an impact polystyrene;
    (d) a fourth layer comprising an impact polystyrene;
    (e) a first adhesive;
    (f) a fifth layer comprising a polypropylene layer; and
    (g) a second adhesive;
    wherein said third layer is located between said first and said second layers, said fourth layer being located adjacent to said first layer, said first layer being located between said third and said fourth layers, said first adhesive being located between said second and said third layers, said fourth layer being located between said second adhesive and said first layer, and said second adhesive being located between said fourth layer and said fifth layer.

2. The sheathing of claim 1, wherein the polymeric cross-woven scrim includes a third portion, the third portion being located near the periphery of the polymeric scrim layer opposite the second portion, the third portion having a third machine direction scrim count number and a third transverse direction scrim count number, at least one of the third machine direction scrim count number and the third transverse direction scrim count number being greater than the respective first machine direction scrim count number or the first transverse direction scrim count number.

3. The sheathing of claim 2, wherein the second and third machine direction scrim count numbers are the same.

4. The sheathing of claim 2, wherein the second and third transverse direction scrim count numbers are the same.

5. The sheathing of claim 2, wherein the second and third portions are located generally parallel to the at least one wall supporting structure.

6. A sheathing adapted to be fastened to at least one wall supporting structure, the sheathing comprising at least three layers:
    (a) a first layer comprising a polymeric foam layer;
    (b) a second layer comprising a polymeric scrim, the polymeric scrim including a first portion and a second portion, the second portion being located near the periphery of the polymeric scrim layer, the first portion having a first machine direction scrim count number and a first transverse direction scrim count number, the second portion having a second machine direction scrim count number and a second transverse direction scrim count number, at least one of the second machine direction scrim count number and the second transverse direction scrim count number being greater than the respective first machine direction scrim count number or the first transverse direction scrim count number;
- (c) a third layer comprising an impact polystyrene;
- (d) a fourth layer comprising an impact polystyrene;
- (e) a first adhesive;
- (f) a polymeric film layer; and
- (g) a second adhesive, wherein said third layer is located between said first and said second layers, said first adhesive being located between said second and said third layers, said fourth layer being located adjacent said first layer, said first layer being located between said third and said fourth layers, said second adhesive being located adjacent said fourth layer, said fourth layer being located between said second adhesive and said first layer, said second adhesive being located between said fourth layer and said polymeric film layer.

7. The sheathing of claim 6, wherein said polymeric foam is a polyolefin foam.

8. The sheathing of claim 6, wherein said polymeric foam is a polystyrenic foam.

9. The sheathing of claim 6, wherein said polymeric scrim is a woven polypropylene scrim.

10. The sheathing of claim 6, wherein said polymeric scrim is a polyolefin scrim.

11. The sheathing of claim 6, wherein said polymeric scrim is a cross-woven scrim.

12. The sheathing of claim 6, wherein said polymeric film layer comprises polypropylene.

13. The sheathing of claim 6, wherein the polymeric scrim includes a third portion, the third portion being located near the periphery of the polymeric scrim layer opposite the second portion, the third portion having a third machine direction scrim count number and a third transverse direction scrim count number, at least one of the third machine direction scrim count number and the third transverse direction scrim count number being greater than the respective first machine direction scrim count number or the first transverse direction scrim count number.

14. The sheathing of claim 13 wherein the second and third machine direction scrim count numbers are the same.

15. The sheathing of claim 13, wherein the second and third transverse direction scrim count numbers are the same.

* * * * *